United States Patent
Straub et al.

(10) Patent No.: US 10,023,300 B2
(45) Date of Patent: Jul. 17, 2018

(54) SYSTEMS AND METHODS FOR INTELLIGENT ATTITUDE DETERMINATION AND CONTROL

(71) Applicant: University of North Dakota, Grand Forks, ND (US)

(72) Inventors: Jeremy Straub, Grand Forks, ND (US); Michael Wegerson, Maple Grove, MN (US); Ronald Marsh, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 0 days.

(21) Appl. No.: 15/173,305

(22) Filed: Jun. 3, 2016

(65) Prior Publication Data

US 2016/0355252 A1  Dec. 8, 2016

Related U.S. Application Data

(60) Provisional application No. 62/171,752, filed on Jun. 5, 2015.

(51) Int. Cl.
| | | |
|---|---|---|
| *B64C 13/16* | (2006.01) | |
| *G05D 1/08* | (2006.01) | |
| *B64C 39/02* | (2006.01) | |
| *B64C 1/00* | (2006.01) | |

(52) U.S. Cl.
CPC .............. *B64C 13/16* (2013.01); *B64C 1/00* (2013.01); *B64C 39/024* (2013.01); *G05D 1/0825* (2013.01)

(58) Field of Classification Search
CPC .... B64C 13/16; B64C 39/024; G05D 1/0825; G01C 19/00; B64G 1/00
See application file for complete search history.

(56) References Cited

U.S. PATENT DOCUMENTS

| | | | | |
|---|---|---|---|---|
| 3,866,025 | A * | 2/1975 | Cavanagh | B64G 1/26 244/169 |
| 9,874,879 | B2 * | 1/2018 | Weiss | G05D 1/0883 |
| 2002/0020785 | A1 * | 2/2002 | Eyerly | B64G 1/242 244/164 |
| 2008/0315039 | A1 * | 12/2008 | Rudd | B64G 1/24 244/164 |
| 2009/0204324 | A1 * | 8/2009 | Trautenberg | B64G 1/24 701/530 |
| 2009/0237302 | A1 * | 9/2009 | Derbez | G01S 19/05 342/357.66 |

(Continued)

*Primary Examiner* — Anne M Antonucci
(74) *Attorney, Agent, or Firm* — Schwegman Lundberg & Woessner, P.A.

(57) ABSTRACT

The systems and methods described herein include attitude determination and control system (ADCS) and associated methods. Systems for determining attitude may be used by various vehicle types, such as to determine the vehicle's attitude relative to an external point of reference. The ADCS may be used for passive or active stabilization of spin on multiple axes. The ADCS uses an incorporated autonomous control algorithm to characterize the effects of actuation of the system components and simultaneously trains its response to attitude actuators. This characterization generates and updates a movement model, where the movement model is used to indicate or predict the effect of one or more attitude actuators given vehicle state information.

18 Claims, 5 Drawing Sheets

(56) References Cited

U.S. PATENT DOCUMENTS

| | | | |
|---|---|---|---|
| 2011/0196550 A1* | 8/2011 | Carrico, Jr. | B64G 1/242 |
| | | | 701/13 |
| 2012/0176271 A1* | 7/2012 | Dai | G01S 19/04 |
| | | | 342/357.44 |
| 2015/0274328 A1* | 10/2015 | Wallner | B64G 3/00 |
| | | | 701/519 |
| 2016/0147203 A1* | 5/2016 | Di Cairano | G05B 13/042 |
| | | | 700/30 |
| 2017/0139427 A1* | 5/2017 | Weiss | G05D 1/0883 |

* cited by examiner

SYSTEMS AND METHODS FOR INTELLIGENT ATTITUDE DETERMINATION AND CONTROL

RELATED APPLICATION AND PRIORITY CLAIM

This application is related and claims priority to U.S. Provisional Application No. 62/171,752, filed on Jun. 5, 2015 and entitled "SYSTEMS AND METHODS FOR INTELLIGENT ATTITUDE DETERMINATION AND CONTROL," the entirety of which is incorporated herein by reference.

STATEMENT OF GOVERNMENT SPONSORED SUPPORT

The subject matter here was developed with support under Grant No. 1359244, entitled "Research Experience in Developing Software for Mission Critical Space Systems," awarded by the National Science Foundation. The subject matter here was also developed with support under Grant No. 1616592, entitled "I-Corps: Commercialization for an Autonomous Attitude Determination and Control Technology," awarded by the National Science Foundation. These entities may have certain rights to the subject matter herein.

BACKGROUND

Vehicles (e.g., spacecraft) often require a specific orientation to perform various tasks, such as broadcasting a radio signal toward earth. Existing solutions for reorienting vehicles require numerous, possibly manual, calculations to characterize a movement model, where the movement model describes how the vehicle orientation will be affected by a reorientation device. For spacecraft, these calculations are performed before launch or sent to the vehicle after launch. Additionally, communication with the vehicle often requires a specific vehicle antenna orientation, which may depend on the ability of the vehicle and be impaired by a lack of ability to reorient itself using an outdated movement model.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

The subject matter described herein includes an attitude determination and control system (ADCS) and associated methods. Systems for determining attitude (e.g., orientation, angular position), may be used by airborne and space-based vehicles, such as to determine the vehicle's attitude relative to an external point of reference. For example, an airplane navigation system may determine the roll, pitch, and yaw of the aircraft relative to the earth. In another example, a spacecraft (e.g., space vehicle, satellite) may use an ADCS to determine and maintain a selected attitude, such as to keep a space-based camera facing Earth. This disclosure describes embodiments of the ADCS with respect to a vehicle. The present subject matter may apply to manned or unmanned spacecraft (e.g., space vehicles), Unmanned Aerial Vehicles (UAVs), aircraft, terrestrial vehicles, submersible vehicles, or other vehicles.

The ADCS has several important features. First, it can be used in multiple modes spanning from a passive stabilization of two axes and unconstrained spin on a third axis to a three-axis full active stabilization. It also includes components to transfer rotational momentum (e.g., to reduce or "dump" spinning momentum). The ADCS uses an incorporated autonomous control algorithm to characterize the effects of actuation of the system components (e.g., reaction wheels, magnetorquers). This autonomous characterization generates and updates a movement model, where the movement model is used to indicate or predict the effect of the use of one or more attitude actuators, where the movement model update may include the use of vehicle state information. Vehicle state information, which may include mass, center of mass, temperature, moment of inertia, outgassing, fuel level and matter state (e.g., solid, liquid, gas), or other information affecting vehicle motion, can be used to augment model-based decision making. Creating and updating the movement model allows the ADCS to respond to changing conditions that affect the movement model, such as vehicle damage, movement induced by component deployment, changes in moment of inertia due to depleted fuel, or other changing conditions.

The systems and methods for attitude determination and control described herein provide an autonomous technical solution that is scalable to large and small vehicle. For example, the present subject matter may be implemented on a CubeSat spacecraft, where a 1-U CubeSat has dimensions of approximately 10 cm×10 cm×10 cm, and other CubeSats may include 2-U, 3-U, 6-U, 27-U, or other sizes. This same technology may be applied to much larger spacecraft, including those that may be Hubble Space Telescope-sized or manned spacecraft.

The ADCS described herein provides several advantages over existing solutions. For example, this ADCS does not require performing numerous potentially manual calculations to develop a movement model prior to implementation or vehicle launch. Similarly, the movement model does not need to be re-characterized manually or remotely if an expected or unexpected change occurs. Additionally, the autonomous ability to correct orientation enables the vehicle to reorient a communications antenna to reestablish communication with a terrestrial control station. This autonomous correction may prevent vehicle loss, such as might occur when the vehicle attitude is affected by an external event and if the movement model needed to be analyzed or corrected via communications with the terrestrial control station.

The intelligent attitude determination and control system is based on the application of artificial intelligence (AI) or computational intelligence (CI) techniques to the problem of attitude determination and control. The initial implementation of this system is using an expert systems framework; however, other approaches (such as those using fuzzy logic and hybrid techniques, etc.) are possible.

Figure 1:
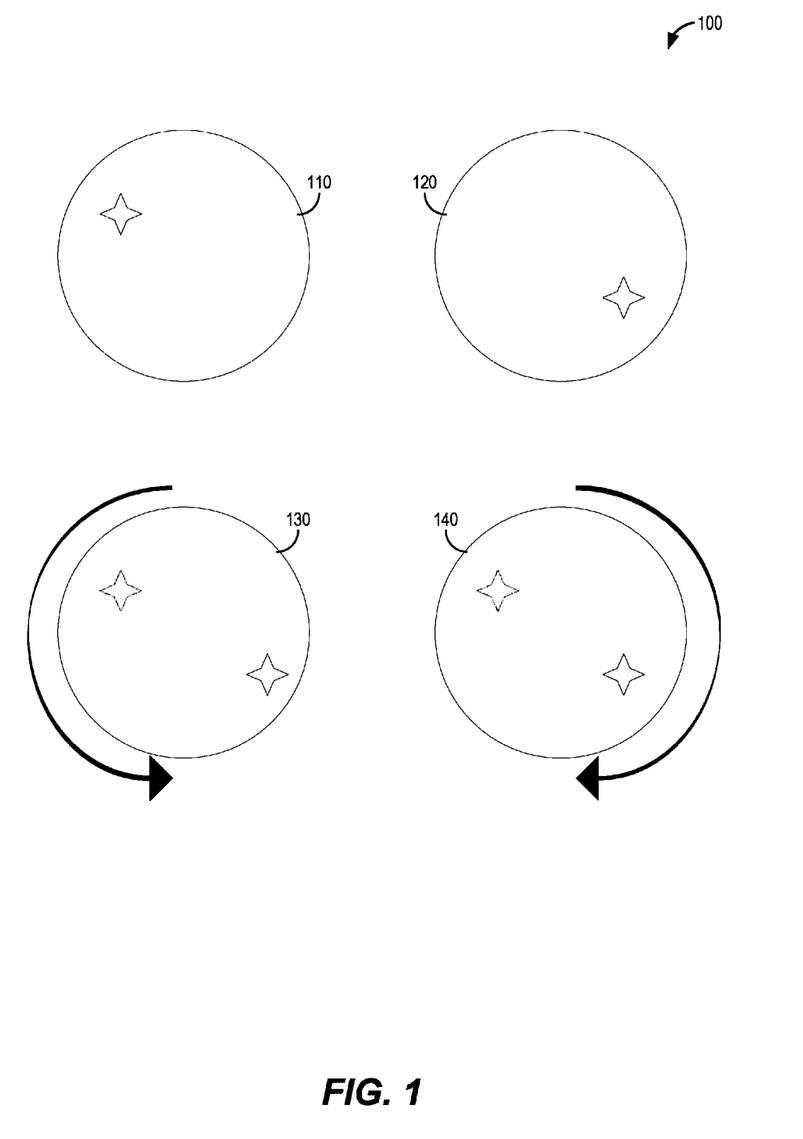
FIG. 1 illustrates one possible simple orientation adjustment, in accordance with some embodiments.

FIG. 1 illustrates one possible simple orientation adjustment 100, in accordance with some embodiments. The ADCS uses a movement model to determine what actuators to engage and project an output orientation adjustment in response to actuator use. The system initially develops, validates, or updates the movement model, and later updates the movement model as normal operations continue. This movement model, combined with an expert system rule-fact network (or other technique), is used to determine how to effect various movement goals. A movement goal is presented as a desired target orientation (e.g., goal orientation) or spin rate change. For example, FIG. 1 illustrates an orientation adjustment 100 relative to a single axis of rotation. In the example rotation shown in FIG. 1, the desired rotation is from the initial orientation 110 to the final orientation 120. Because the axis of rotation is the center of the circle, the final orientation 120 may be accomplished using a counterclockwise rotation 130 or using a clockwise rotation 140. Though FIG. 1 illustrates an orientation adjustment 100 about a single axis of rotation, adjustments that are more complex may be made relative to two or more axes of rotation.

An orientation adjustment 100, such as illustrated in FIG. 1, is decomposed by the movement command processing system within the expert system into a difference between the current orientation and the target orientation. This difference is then used to determine multiple orientation change solutions that could be used to achieve this goal, where the change solutions include various combinations of actuator activations. The prospective solutions may differ in the paths that are taken or in the actuators that are used to create the change. These solutions are then evaluated based on factors including cost, risk, end state desirability, and completeness. For example, if the device is not able to be reoriented completely into the target orientation, the system may select the orientation change solution that is the closest to the target orientation. Alternately, an incomplete solution with significantly lower cost may be selected in some instances.

The orientation adjustment 100 may be realized by various actuator-induced movements. Actuators may include a reaction wheel (e.g., a motor connected to a mass that creates attitude changes for a vehicle via movement of the mass), a magnetorquer (e.g., an electromagnet that is used to change the attitude of a vehicle via interaction with a pre-existing magnetic field), or other devices that exert a directional or rotational force. For example, for a given change in orientation and motion, a specific combination of reaction wheels and magnetorquers could be used to effect the change. While producing the same movement path, the choice of different actuation approaches may have different power (or other resource) requirements and create a more or less desirable end state. For example, using a combination of reaction wheels to create spin and magnetorquers to dampen spin may require continual motion from the reaction wheels, which would have a significant effect on long-term power needs. The effect of actuator combinations may be different given the movement path chose and current state of the vehicle. For example, an approach sequentially first using a reaction wheel and second using a magnetorquer may be beneficial for movement in one direction, but may have the opposite effect for a movement path in the opposite direction.

If the movement model for the vehicle was known a priori and did not change, then an expert system could be developed prior to flight that could contain a set of rules and facts to enable this decision making process. In each case, the goal and current state would be presented to the expert system and a solution would be provided. This expert system would embody the movement model and provide the movement command processing system functionality. However, the complexity is significantly increased during real-world operation. Several factors must be considered. First, vehicle resources (e.g., propellant) may be consumed over time, which will change the center of mass, the overall mass, and effect of actuation. Second, the effectiveness of actuators may change over time (e.g., diminish), and sending the same command at the start of the mission and at the end of the mission may have different effects. Third, actuators may break or suffer significant impairment. This last category of change may render a subset of prospective movement solutions impossible or significantly increase their risk of non-completion or further damage to the actuator. A learning mechanism (e.g., correction or update mechanism) for the expert system enables changes to the rule network based on changing conditions. One mode of operation of this update mechanism is shown and describe below with respect to FIG. 2.

Figure 2:
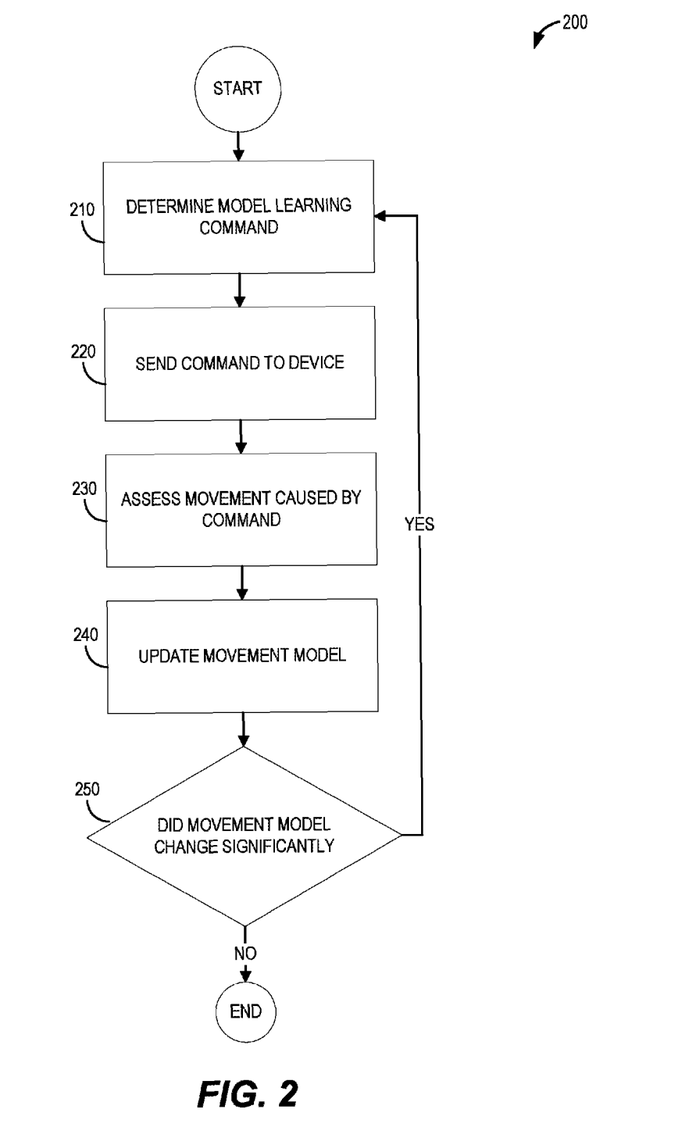
FIG. 2 depicts a block diagram of a movement model learning command analysis loop, in accordance with some embodiments.

FIG. 2 depicts a block diagram of a movement model learning command analysis loop 200, in accordance with some embodiments. The analysis loop 200 may be implemented by the expert system. The analysis loop 200 begins by determining the model learning command 210. The learning command may be provided from a user, may be determined by the expert system from a current state, or may be generated by the expert system based on a current or expected movement model. A learning command is a commanded movement designed to calibrate or facilitate assessment of the response of the vehicle. For example, the learning command may command a partial rotation on all three axes, and the response of the vehicle to that command may be measured and analyzed to determine the response of the vehicle. The learning command may include any adjustment in orientation, location, velocity of rotation, or other movement.

After determining the model learning command 210, the learning command is then sent to the device 220. This may include sending the learning command from one module to another within the vehicle, or may include transmission of the learning command from a remote location to the vehicle. The vehicle moves in response to the learning command, and the movement determination processing system then assesses the movement caused by the learning command. Based on the response of the vehicle to the learning command, the movement model may be updated 240. A significance threshold may be applied to determine whether a difference is sufficient to facilitate an update to the movement model. The movement model itself may then be analyzed to determine if it has changed significantly 250. If the movement model has changed sufficiently, then the analysis loop 200 may be repeated, beginning by determining the model learning command 210.

The movement model learning command analysis loop 200 may be used in the configuration and tuning of a wind tunnel. A sensed movement model may be created or updated for the fixed sensor unit. This model is then compared to an ideal movement model to determine whether there has been a significant change. The discrepancies between the sensed movement model and ideal movement model represent changes that must be made to the wind tunnel. Applying the processes shown in FIG. 2, the wind tunnel configuration and tuning includes determining 210 a model learning command. This model learning command is then sent to the wind tunnel device 220. The results of the command are assessed 230 by comparing the sensed movement model and ideal movement model. The movement model for the wind tunnel is updated 240 by making changes to the configuration of the wind source and wind control surfaces. The significance of the changes and the initial discrepancy are assessed to determine whether the moment model has been changed significantly 250, such as by comparing the difference against a model change threshold. In various embodiments, the threshold is a static value, a dynamic value, or configurable by the user. If the model changed significantly, the wind tunnel configuration and tuning process repeats. If the change is determined to be no change or a trivial change, then the process terminates.

The movement model learning command analysis loop 200 may be used to characterize or control irregular UAVs (e.g., aerial drones). UAVs may have irregular flight surfaces and other characteristics that may cause erratic behavior, where the irregular flight surfaces may be due to printing imprecision, human error, or material flaws. These irregularities are common in homemade UAVs, where the limitations of hobbyist fabrication equipment and hobbyist skills often results in irregular flight surfaces. This results in UAVs that are hard to control manually, and result in UAVs where typical autopilot options are either not well suited or not operable at all. Through limited automated training regarding the sensors and actuators of a UAV, and through the characterization of its movement and performance under various actuator conditions, a single control unit can be used to control UAVs of various designs. Applying the processes shown in FIG. 2, the disclosed technology would determine 210 and send 220 one or more movement learning commands to the UAV device. For each, it would then assess the movement caused by the command 230 and compare this to the expected movement. If the difference between the expected movement and the command-caused movement exceeded a movement threshold, then the movement model could be updated 240. In various embodiments, the threshold is a static value, a dynamic value, or configurable by the user. The change to the movement model may then be assessed 250 to determine if a significant change occurred. If so, the process would repeat for this model learning command. If not, then it would move on to the next model learning command or conclude.

By characterizing the flight dynamics of a UAV using sensors on or off the UAV, the model learning command analysis loop 200 allows a single controller to be applied to multiple UAVs from multiple manufacturers. This allows an operator to gain familiarity with a single control approach or single control mechanism. This increased familiarity between an operator and UAV allows the operator to move easily from craft-to-craft, reducing training costs and prospective accidents due to accidental maloperation. As part of this process, multiple model learning commands 210 may be determined. Each of these model-learning commands would be sent to the UAV device 220. The movement caused by the command may be assessed 230, such as using sensors on the UAV, sensors external to the UAV, and internal or external processing hardware implementing the model learning command analysis loop 200. If the difference between the command-caused movement and the expected movement exceeded a movement threshold, then the movement model could be updated 240. In various embodiments, the threshold is a static value, a dynamic value, or configurable by the user. The change to the movement model may then be assessed 250 to determine if a significant change occurred. If so, the process would repeat for this model learning command. If not, then it would move on to the next model learning command or conclude.

A second expert system may be used to evaluate the efficacy of the decision-making of the first expert system, though other AI CI technologies could be used for this component. Both the primary system and any system that overseas or provides redundancy for the primary system may be threshold-based, and could make changes only in cases when a single error surpasses a mission-defined acceptable level, or when a low level of error persists for a mission-defined length of time. By changing state information or primary expert system rules, the movement model for the vehicle will be changed, allowing simplified identification of future movement solutions. This may reduce the need for making an inaccurate maneuver and taking corrective action to correct undesired, excessive, or insufficient movement.

Figure 3:
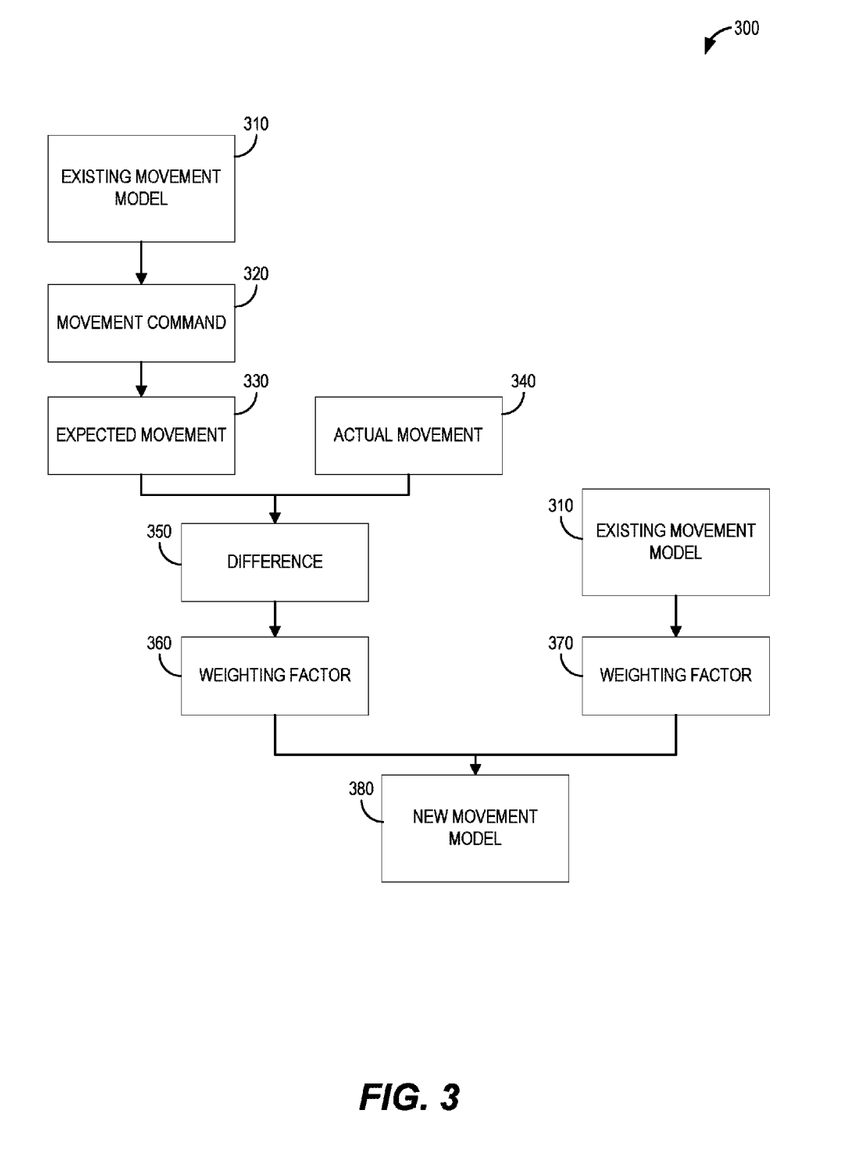
FIG. 3 depicts a block diagram of a movement model updated by motion feedback, in accordance with some embodiments.

FIG. 3 depicts a block diagram of a movement model updated by motion feedback 300, in accordance with some embodiments. The movement model update procedure 300 may be implemented within the expert system. The movement model update procedure 300 includes determining the existing movement model 310, determining the movement command 320, and determining the expected movement 330. The expected movement 330 and the actual movement 340 may be compared to determine a movement difference 350. The movement difference 350 may be scaled by a weighting factor 360 to create a weighted difference. The existing movement model 310 may itself be scaled by a different weighting factor 370. The weighted movement model may be combined with the weighted difference to generate a new movement model 380. These mission-specific weighting factors 360 and 370 are used to constrain the magnitude of effect applied to the existing movement model, based on the difference between the expected and actual movement, when updating the movement model. This enables control of the speed of change of the movement model, thereby reducing the probability that sensor failures or temporary actuator malfunctions will dramatically alter the movement model. This also enables rapid updating of the movement model to reflect actual system changes. Different weighting values may also be used depending on the system's mode of operation or the detection of a hardware error.

The movement model updated by motion feedback 300 may be used to respond to changes in the control of a manned aircraft. Unanticipated occurrences and changing conditions may cause the control model of an aircraft to change dramatically in a short period of time. This is especially true for small aircraft, or for any aircraft operating at low altitude. This dramatic change in the control model may result in damage to or the loss of the aircraft. The movement model updated by motion feedback 300 can facilitate adapting to changes of the control model (e.g., due to control surface damage, etc.) far more rapidly than a human would be able to, allowing the human pilot's commands (being issued based on the normal control model) to be translated into commands that produce the desired actions under an altered control model. As a part of this process, the movement model updated by motion feedback 300 would monitor the pilot and/or autopilot commands 320, where the commands are monitored relative to an existing movement model 310. Using the commands and model data, the expected movement is determined 330 and compared this to the actual movement 340 to determine the difference 350. A difference weighting factor 360 and existing movement model weighting factor 370 may be applied to the computed difference 350 and the existing movement model 310, respectively. Weighting factors 360 may be used to balance the need for responsiveness to changing conditions against the potential for sensor failure and other errors. A new movement model 380 may be created by combining these values. This new movement model would then be used for the control of the aircraft. The monitoring would be ongoing, and the process would continue adapting the movement model over time, as necessary. As some weighting value factors may not allow the model to adapt to a dramatic change immediately, in these cases, the model would move to encompass the change fully over time, where the time may include a statically or dynamically determined period. Alternate weighting values could be used to allow faster or instant response, as dictated by the needs of the application.

The movement model updated by motion feedback 300 may be used in controlling an automobile or other terrestrial vehicle. Some automobiles include technologies to assist in remaining within a driving lane, to assist a driver in performing maneuvers, or to perform braking or other maneuvers without driver intervention. These technologies, and conventional vehicle steering systems, are all based on a presumed movement model for an automobile. This movement model may become inaccurate due to weather (e.g., a strong crosswind), due to other external factors, or due to mechanical or other vehicle component failure. The movement model updated by motion feedback 300 may be used to correct the actuation produced by user-vehicle interaction (or autonomous command system-vehicle interaction) by altering the commands sent to the actuators to produce the user/controller-expected response based on the current movement model. To accomplish this, the movement model updated by motion feedback 300 may continuously monitor user/controller-generated commands 320, and may determine the expected movement 330 based on the existing movement model 310. The expected movement 330 is compared with the actual movement 340 to determine the difference 350. An expected movement weighting factor 360 may be applied to the difference 350, and an existing movement model weighting factor 370 may be applied to the existing movement model 310. These would be combined to produce a new movement model 380. Based on the weighting factors selected, the vehicle may respond quickly or gradually over time to changing conditions. An additional control system component may be included to classify what type of change was predicted to have occurred and adjust the weighting factors based on the presumed-nature of the detected change. This would allow different levels of responsiveness, corresponding to appropriate responses to different types of conditions.

Figure 4:
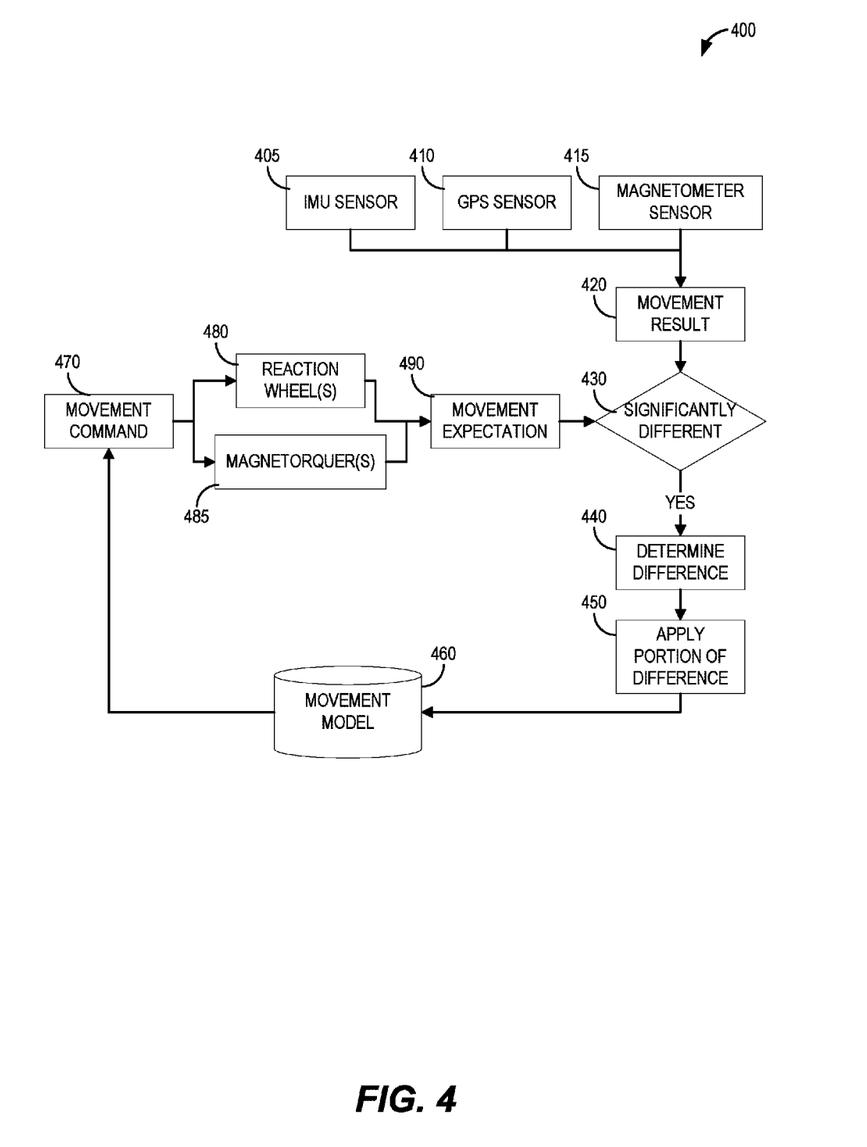
FIG. 4 depicts a block diagram of a movement model updated by sensor input and motion feedback loop, in accordance with some embodiments.

FIG. 4 depicts a block diagram of a movement model updated by sensor input and a motion feedback loop 400, in accordance with some embodiments. Various sensors may be used to update a motion model, such as an inertial measurement unit (IMU) 405, a GPS 410, or a magnetometer 415. The various sensor readings may be combined and possibly processed to yield a movement result 420. The sensor-based movement result 420 may be compared 430 against an expected movement result. If the sensor-based movement result 420 differs significantly from the expected movement result, the absolute difference may be determined 440, and a portion (e.g., percentage) of that difference may be selected 450 to generate a movement model correction. The percentage of the difference may be selected based on various factors. For example, a higher portion of the difference may be selected for generating or training the movement model. Alternatively, a lower portion of the difference may be selected to provide gradual updates to the motion model of an operational satellite. The movement model correction may be applied to the movement model 460 to generate a corrected movement model.

A movement command 470 may be generated by the expert system for the purposes of generating the movement model, updating it during a period when movement is not occurring, testing the functionality of various actuators, characterizing a particular type of movement, or for other reasons. The movement command 470 may be generated from the sensor-corrected movement model, which is applied to one or more actuators, such as reaction wheels 480 or magnetorquers 485. Based on the current movement model, a movement expectation 490 (e.g., a predicted orientation adjustment) is generated. New sensor data is then collected to determine a new movement result 420 from the point of view of the sensors, which is then compared to the movement expectation 490 to determine if there are significant differences 430. The sensor input and motion feedback loop 400 may continue until a desired threshold is met, such as the vehicle being in a desired orientation or the feedback loop 400 determining that there are not significant differences between the movement result 420 and the movement expectation 490.

Figure 5:
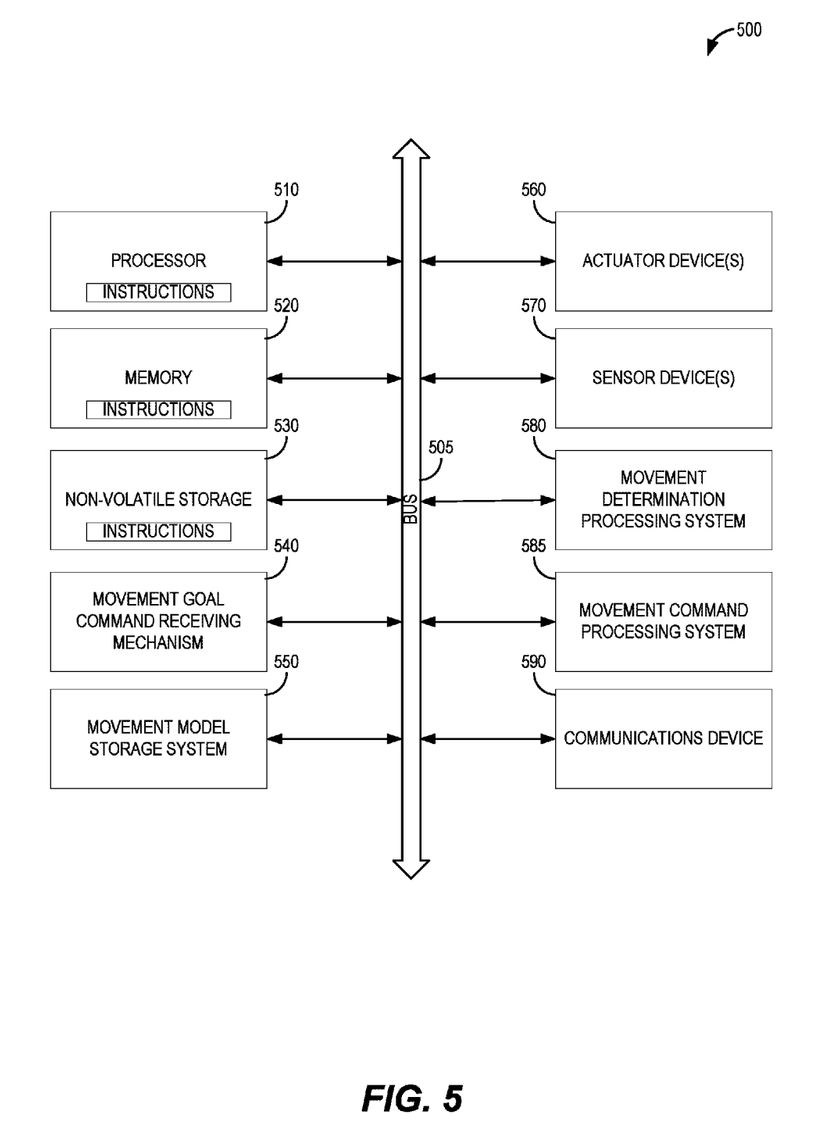
FIG. 5 is a block diagram illustrating an example of a machine, upon which one or more embodiments may be implemented.

FIG. 5 is a block diagram illustrating an example of a machine 500, upon which one or more embodiments may be implemented. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a cyberphysical system (e.g., a combination of processing, sensing, or actuating components) or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

As described herein, examples may include or operate by logic or a number of components or mechanisms. The components or mechanisms may be implemented in software, hardware, firmware, or other media. In an example, hardware of the circuit set may be immutably designed to carry out a specific operation (e.g., hardwired or dedicated integrated circuit (IC)). Circuit sets are a collection of circuits implemented in tangible entities that include hardware (e.g., simple circuits, gates, logic, etc.). Circuit set membership may be flexible over time and underlying hardware variability. Circuit sets include members that may perform specified operations when operating alone or in combination. In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system, cyberphysical system) 500 may include a hardware processor 510, where the hardware processor 510 may include a central processing unit (CPU), a graphics processing unit (GPU), a hardware processor core, or any combination thereof. Machine 500 may also include a main memory 520 and a non-volatile storage 530. Components of machine 500 may communicate with each other via an interlink 505 (e.g., bus).

Instructions may reside completely or partially within the hardware processor 510, within main memory 520, or within non-volatile storage 530 during execution thereof by the machine 500. The instructions (e.g., software or one or more sets of data structures) may embody or be used by any one or more of the techniques or functions described herein. In an example, one or any combination of the hardware processor 510, main memory 520, or non-volatile storage 530 may constitute machine-readable media. The term "machine-readable media" may include a single medium or multiple media (e.g., a centralized or distributed database, or associated caches and servers) configured to store the one or more instructions. The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories or optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

Machine 500 may include a movement goal command receiving mechanism 540. The movement goal command receiving mechanism 540 may include a communications port or another communications mechanism capable of sending or receiving the movement goal. The movement command may be provided from a user, determined from a current state, triggered autonomously based on mission goals, or generated based on a current or expected movement model.

Machine 500 may include a movement model storage system 550. The movement model storage system 550 may be used to store and manage memory or commands associated with the movement model. For example, the movement model storage system 550 may store or manage movement model memory or commands within the hardware processor 510, within main memory 520, or within non-volatile storage 530.

Machine 500 may include various actuator devices 560. For example, actuator devices 560 may include a reaction wheel (e.g., a motor connected to a mass that creates attitude changes for a vehicle via movement of the mass), a magnetorquer (e.g., an electromagnet that is used to change the attitude of a vehicle via interaction with a pre-existing magnetic field), or other devices that exert a directional or rotational force. The actuator devices 560 may be used to effect changes in attitude relative to a fixed location.

Machine 500 may include various sensor devices 570. For example, sensor devices 570 may include a GPS unit to collect data from vehicle and determine unit position, or may determine orientation by comparing the calculated position of two or more GPS units with separated antenna positions. Sensor devices 570 may also include an IMU that uses electronic components such as accelerometers, gyroscopes, or magnetic-field sensing magnetometers, where the IMU is used to determine external forces affecting orientation. The sensor devices 570 may be used to determine absolute or changes in position, motion, or attitude relative to a fixed location.

Machine 500 may include a movement determination processing system 580. System 580 may include software, dedicated sensor hardware, dedicated processing hardware, or other components. The movement determination processing system 580 may receive data from various sensor devices 570, and may determine the direction and magnitude of changes in attitude. The movement determination processing system 580 may also receive a movement goal from the movement goal command receiving mechanism 540, and may store an updated movement model in the movement model storage system 550.

Machine 500 may include a movement command processing system 585. System 585 may include software, dedicated sensor hardware, dedicated processing hardware, or other components. The movement command processing system 585 determines a specific actuation required by actuator devices 560 and creates the appropriate commands to instruct the actuator devices 560 to execute the corrections Instructions or data, such as the movement model, may be transmitted or received over a communications device 590 using a transmission medium using any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), and wireless data networks (e.g., networks operating according to the Institute of Electrical and Electronics Engineers (IEEE) 802.11 family of standards known as Wi-Fi®, networks operating according to the IEEE 802.16 family of standards known as WiMax®, and networks operating according to 3GPP Long Term Evolution (LTE) specifications), IEEE 802.15.4 family of standards, peer-topeer (P2P) networks, among others. In an example, the communications device 590 may include one or more antennas. In an example, the communications device 590 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

Additional Notes & Example Embodiments:

Example 1 is a method for vehicle attitude determination and control, the method comprising: determining a movement expectation based on a movement model; receiving a movement result from one or more sensors; comparing the movement result with the movement expectation to determine a calculated movement difference; comparing the calculated movement difference to a minimum movement difference threshold; when the calculated movement difference exceeds the minimum movement difference threshold, updating the movement model based on a portion of the calculated movement difference.

In Example 2, the subject matter of Example 1 optionally includes wherein the minimum movement difference threshold is associated with at least one movement type.

In Example 3, the subject matter of any one or more of Examples 1-2 optionally include generating a movement goal command based on the movement model using a hardware-implemented movement determination processing module; and generating one or more actuator instructions to effect the movement goal using the hardware-implemented movement determination processing module.

In Example 4, the subject matter of Example 3 optionally includes sending the one or more actuator instructions from the movement determination processing module to a hardware-implemented movement command processing module; and instructing, using the hardware-implemented movement command processing module, one or more actuators to execute the one or more actuator instructions.

In Example 5, the subject matter of any one or more of Examples 1-4 optionally include wherein the one or more sensors include a global positioning system unit, an inertial measurement unit, or a magnetometer.

In Example 6, the subject matter of any one or more of Examples 1-5 optionally include wherein the one or more actuators include a reaction wheel, a motor, a magnetorquer, or an electromagnet.

In Example 7, the subject matter of any one or more of Examples 3-6 optionally include wherein: the one or more actuators include a plurality of reaction wheels and a plurality of magnetorquers; and the movement command processing system generates one or more actuator instructions to command the one or more actuators to change a vehicle attitude.

In Example 8, the subject matter of any one or more of Examples 4-7 optionally include generating, using the movement determination processing system, an updated movement model; and storing the updated movement model in a movement model storage device.

In Example 9, the subject matter of any one or more of Examples 1-8 optionally include wherein the movement model is based on a predicted movement model for a CubeSat satellite.

In Example 10, the subject matter of any one or more of Examples 1-9 optionally include wherein the movement model is based on a predicted movement model for a vehicle whose mass is less than 100 kilograms.

In Example 11, the subject matter of any one or more of Examples 1-10 optionally include wherein the movement model is based on a predicted movement model for a vehicle whose mass is more than 100 kilograms.

In Example 12, the subject matter of any one or more of Examples 1-11 optionally include wherein the movement model is based on a predicted movement model for a wind tunnel device.

In Example 13, the subject matter of any one or more of Examples 1-12 optionally include wherein the movement model is based on a predicted movement model for an aerial vehicle with at least one irregular flight surface.

In Example 14, the subject matter of any one or more of Examples 1-13 optionally include wherein the movement model is based on a predicted movement model for a manned aerial vehicle.

In Example 15, the subject matter of any one or more of Examples 1-14 optionally include wherein the movement model is based on a predicted movement model for a plurality of UAVs, where the predicted movement model may be used to translate various sensor inputs into a plurality of stable control signals for the plurality of UAVs.

In Example 16, the subject matter of any one or more of Examples 1-15 optionally include wherein the movement model is based on a predicted movement model for a vehicle-assisted operation command for a terrestrial vehicle.

Example 17 is a system comprising: one or more sensors to generate a movement result; an expert system, the expert system including a hardware-implemented movement model module configured to: determine a movement expectation based on a movement model; compare the movement result with the movement expectation to determine a calculated movement difference; compare the calculated movement difference to a minimum movement difference threshold; when the calculated movement difference exceeds the minimum movement difference threshold, update the movement model based on a portion of the calculated movement difference.

In Example 18, the subject matter of Example 17 optionally includes wherein the minimum movement difference threshold is associated with at least one movement type.

In Example 19, the subject matter of any one or more of Examples 17-18 optionally include wherein the expert system further includes a hardware-implemented movement determination processing module, the movement determination processing module configured to: generate a movement goal command based on the movement model; and generate one or more actuator instructions to effect the movement goal.

In Example 20, the subject matter of Example 19 optionally includes wherein the expert system further includes a hardware-implemented movement command processing module, the movement command processing module configured to: receive the one or more actuator instructions from the movement determination processing module; and instruct one or more actuators to execute the one or more actuator instructions.

In Example 21, the subject matter of any one or more of Examples 17-20 optionally include wherein the one or more sensors include a global positioning system unit, an inertial measurement unit, or a magnetometer.

In Example 22, the subject matter of any one or more of Examples 17-21 optionally include wherein the one or more actuators include a reaction wheel, a motor, a magnetorquer, or an electromagnet.

In Example 23, the subject matter of any one or more of Examples 19-22 optionally include wherein: the one or more actuators include a plurality of reaction wheels and a plurality of magnetorquers; and the movement command processing system generates one or more actuator instructions to command the one or more actuators to change a vehicle attitude.

In Example 24, the subject matter of any one or more of Examples 20-23 optionally include generating, using the movement determination processing system, an updated movement model; and storing the updated movement model in a movement model storage device.

In Example 25, the subject matter of any one or more of Examples 17-24 optionally include wherein the movement model is based on a predicted movement model for a CubeSat satellite.

In Example 26, the subject matter of any one or more of Examples 17-25 optionally include wherein the movement model is based on a predicted movement model for a vehicle whose mass is less than 100 kilograms.

In Example 27, the subject matter of any one or more of Examples 17-26 optionally include wherein the movement model is based on a predicted movement model for a vehicle whose mass is more than 100 kilograms.

In Example 28, the subject matter of any one or more of Examples 17-27 optionally include wherein the movement model is based on a predicted movement model for a wind tunnel device.

In Example 29, the subject matter of any one or more of Examples 17-28 optionally include wherein the movement model is based on a predicted movement model for an aerial vehicle with at least one irregular flight surface.

In Example 30, the subject matter of any one or more of Examples 17-29 optionally include wherein the movement model is based on a predicted movement model for a manned aerial vehicle.

In Example 31, the subject matter of any one or more of Examples 17-30 optionally include wherein the movement model is based on a predicted movement model for a plurality of UAVs, where the predicted movement model may be used to translate various sensor inputs into a plurality of stable control signals for the plurality of UAVs.

In Example 32, the subject matter of any one or more of Examples 17-31 optionally include wherein the movement model is based on a predicted movement model for a vehicle-assisted operation command for a terrestrial vehicle.

Example 33 is a method for updating a movement model using a hardware-implemented expert system, the method comprising: determining a model learning command, the model learning command configured to be executed by a first combination of vehicle actuators, wherein execution of the model learning command causes creation of a plurality of movement data for a movement model for a vehicle; determining a predicted movement result based on the model learning command; sending the model learning command to the first combination of vehicle actuators; receiving the plurality of movement data from a plurality of sensors, the movement data representing a vehicle movement caused by the execution of the model learning command; determining a movement model difference between the predicted movement result and the movement data; when the movement model difference exceeds a minimum movement model difference threshold, generating an updated movement model based on the movement model difference.

In Example 34, the subject matter of Example 33 optionally includes wherein the minimum movement model difference threshold is associated with at least one movement type.

In Example 35, the subject matter of any one or more of Examples 33-34 optionally include generating a secondary movement model, the secondary movement model representing the effect of the model learning command on a second combination of vehicle actuators.

In Example 36, the subject matter of any one or more of Examples 33-35 optionally include wherein the plurality of sensors includes one or more global positioning system units, inertial measurement units, or magnetometers.

In Example 37, the subject matter of any one or more of Examples 33-36 optionally include wherein the first combination of vehicle actuators includes a reaction wheel, a motor, a magnetorquer, or an electromagnet.

In Example 38, the subject matter of any one or more of Examples 33-37 optionally include wherein the first combination of vehicle actuators includes a plurality of reaction wheels and a plurality of magnetorquers.

In Example 39, the subject matter of any one or more of Examples 33-38 optionally include storing the updated movement model in a movement model storage device.

In Example 40, the subject matter of any one or more of Examples 33-39 optionally include wherein the movement model is based on a predicted movement model for a CubeSat satellite.

In Example 41, the subject matter of any one or more of Examples 33-40 optionally include wherein the movement model is based on a predicted movement model for a vehicle whose mass is less than 100 kilograms.

In Example 42, the subject matter of any one or more of Examples 33-41 optionally include wherein the movement model is based on a predicted movement model for a vehicle whose mass is more than 100 kilograms.

In Example 43, the subject matter of any one or more of Examples 33-42 optionally include wherein the movement model is based on a predicted movement model for a wind tunnel device.

In Example 44, the subject matter of any one or more of Examples 33-43 optionally include wherein the movement model is based on a predicted movement model for an aerial vehicle with at least one irregular flight surface.

In Example 45, the subject matter of any one or more of Examples 33-44 optionally include wherein the movement model is based on a predicted movement model for a manned aerial vehicle.

In Example 46, the subject matter of any one or more of Examples 33-45 optionally include wherein the movement model is based on a predicted movement model for a plurality of UAVs, where the predicted movement model may be used to translate various sensor inputs into a plurality of stable control signals for the plurality of UAVs.

In Example 47, the subject matter of any one or more of Examples 33-46 optionally include wherein the movement model is based on a predicted movement model for a vehicle-assisted operation command for a terrestrial vehicle.

Each of these non-limiting examples can stand on its own, or can be combined in various permutations or combinations with one or more of the other examples.

Conventional terms in the fields of computer vision have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

What is claimed is:

1. A method for vehicle attitude determination and control, the method comprising:
   determining a movement expectation based on a movement model, the movement model characterizing a vehicle movement in response to one or more actuators;
   receiving a movement result from one or more sensors;
   comparing the movement result with the movement expectation to determine a calculated movement difference;
   comparing the calculated movement difference to a minimum movement difference threshold;
   when the calculated movement difference exceeds the minimum movement difference threshold, updating the movement model based on a portion of the calculated movement difference;
   generating a movement goal command based on the updated movement model using a hardware-implemented movement determination processing module;
   generating one or more actuator instructions to effect the movement goal using the movement determination processing module;
   sending the one or more actuator instructions from the movement determination processing module to a hardware-implemented movement command processing module; and
   instructing, using the movement command processing module, the one or more actuators to execute the one or more actuator instructions.

2. The method of claim 1, wherein the minimum movement difference threshold is associated with at least one movement type.

3. The method of claim 1, wherein the one or more sensors include a global positioning system unit, an inertial measurement unit, or a magnetometer.

4. The method of claim 1, wherein the one or more actuators include a reaction wheel, a motor, a magnetorquer, or an electromagnet.

5. The method of claim 1, wherein:
   the one or more actuators include a plurality of reaction wheels and a plurality of magnetorquers; and the movement command processing module generates one or more actuator instructions to command the one or more actuators to change a vehicle attitude.

6. The method of claim 1, further including:
generating, using the movement determination processing module, an updated movement model; and
storing the updated movement model in a movement model storage device.

7. The method of claim 1, wherein the movement model is based on a predicted movement model for a CubeSat satellite.

8. A system comprising:
one or more sensors to generate a movement result;
an expert system, the expert system including a hardware-implemented movement model module configured to:
determine a movement expectation based on a movement model, the movement model characterizing a vehicle movement in response to one or more actuators;
compare the movement result with the movement expectation to determine a calculated movement difference;
compare the calculated movement difference to a minimum movement difference threshold;
when the calculated movement difference exceeds the minimum movement difference threshold, update the movement model based on a portion of the calculated movement difference.

9. The system of claim 8, wherein the minimum movement difference threshold is associated with at least one movement type.

10. The system of claim 8, wherein the expert system further includes a hardware-implemented movement determination processing module, the movement determination processing module configured to:
generate a movement goal command based on the movement model; and
generate one or more actuator instructions to effect the movement goal.

11. The system of claim 10, wherein the expert system further includes a hardware-implemented movement command processing module, the movement command processing module configured to:
receive the one or more actuator instructions from the movement determination processing module; and
instruct one or more actuators to execute the one or more actuator instructions.

12. The system of claim 11 wherein:
the one or more actuators include a plurality of reaction wheels and a plurality of magnetorquers; and
the movement command processing module generates one or more actuator instructions to command the one or more actuators to change a vehicle attitude.

13. The system of claim 11, further including:
generating, using the movement determination processing module, an updated movement model; and
storing the updated movement model in a movement model storage device.

14. The system of claim 8, wherein the movement model is based on a predicted movement model for a CubeSat satellite.

15. A method for updating a movement model using a hardware-implemented expert system, the method comprising:
determining a model learning command, the model learning command configured to be executed by a first combination of vehicle actuators, wherein execution of the model learning command causes creation of a plurality of movement data for a movement model for a vehicle, the movement model characterizing a vehicle movement in response to one or more actuators;
determining a predicted movement result based on the model learning command;
sending the model learning command to the first combination of vehicle actuators;
receiving the plurality of movement data from a plurality of sensors, the movement data representing a vehicle movement caused by the execution of the model learning command;
determining a movement model difference between the predicted movement result and the movement data;
when the movement model difference exceeds a minimum movement model difference threshold, generating an updated movement model based on the movement model difference
generating a movement goal command based on the updated movement model using a hardware-implemented movement determination processing module;
generating one or more actuator instructions to effect the movement goal using the movement determination processing module;
sending the one or more actuator instructions from the movement determination processing module to a hardware-implemented movement command processing module; and
instructing, using the movement command processing module, the one or more actuators to execute the one or more actuator instructions.

16. The method of claim 15, wherein the minimum movement model difference threshold is associated with at least one movement type.

17. The method of claim 15, further including generating a secondary movement model, the secondary movement model representing the effect of the model learning command on a second combination of vehicle actuators.

18. The method of claim 15, wherein the movement model is based on a predicted movement model for a CubeSat satellite.

* * * * *